Sept. 22, 1925.
M. FALK
SPARE TIRE LOCK
Filed May 8, 1924
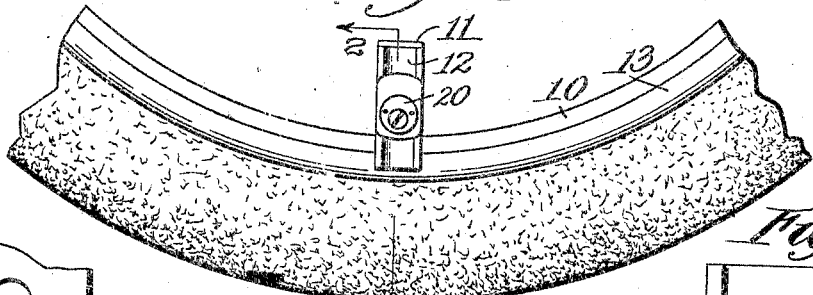
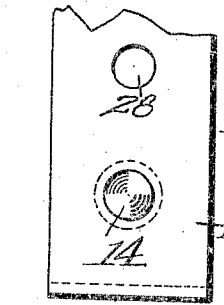
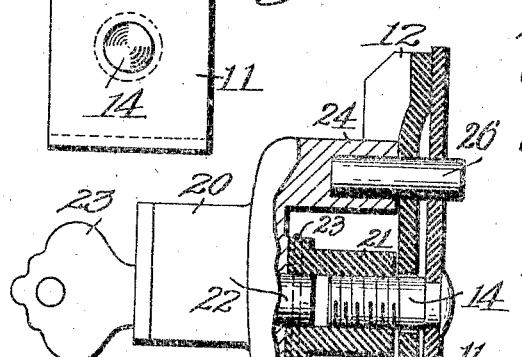
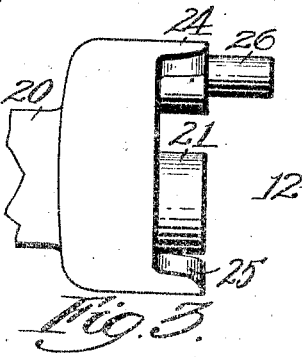
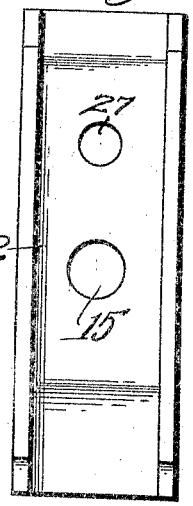
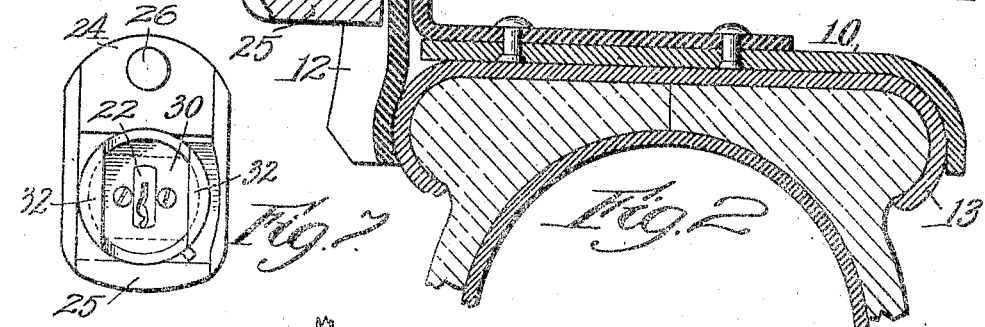
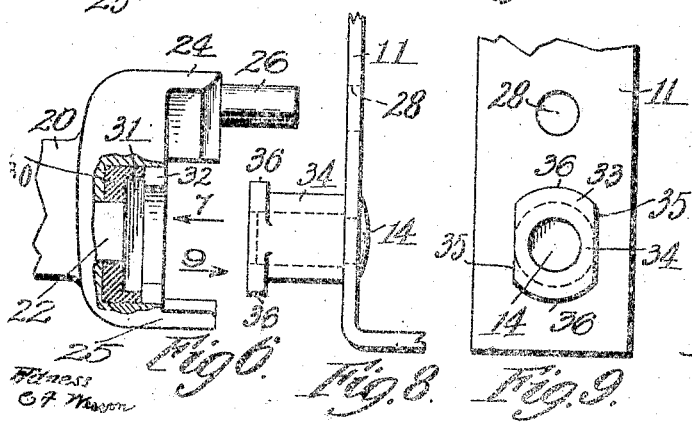
1,554,958
Inventor
Morris Falk
By Attorneys Patented Sept. 22, 1925.

1,554,958

UNITED STATES PATENT OFFICE.

MORRIS FALK, OF LEOMINSTER, MASSACHUSETTS.

SPARE-TIRE LOCK.

Application filed May 8, 1924. Serial No. 711,912.

*To all whom it may concern:*

Be it known that I, MORRIS FALK, a citizen of the United States, residing at Leominster, in the county of Worcester and State of Massachusetts, have invented a new and useful Spare-Tire Lock, of which the following is a specification.

This invention relates to a lock particularly designed for locking a spare tire to a tire carrier, but is capable of other analogous uses.

The principal objects of the invention are to simplify locks of this character by avoiding the necessity of providing a sliding bolt engaging the opposite sides of a nut with which the clamp securing bolt is held in position; to provide means whereby the nut cannot be tampered with from the outside, consisting in housing the nut entirely within the casing of the lock; and to provide simple means for preventing the lock casing from turning.

Reference is to be had to the accompanying drawings, in which—

Fig. 1 is a side view of a tire carrier and tire with a preferred embodiment of this invention applied thereto;

Fig. 2 is an enlarged sectional view of the same on the line 2—2 of Fig. 1;

Fig. 3 is a side view of the lock and nut;

Fig. 4 is an inside elevation of the clamp;

Fig. 5 is a corresponding elevation of the bracket to which it is applied;

Fig. 6 is a side view partly in section of another form of this invention;

Fig. 7 is an inside or end view of the same;

Fig. 8 is an edge view of the clamp, bolt and nut; and

Fig. 9 is an elevation of the same.

Referring first to the first five figures, I have shown the invention as used in connection with a tire carrier 10 to which is riveted a bracket 11 having a part projecting from it for carrying the clamp 12. This clamp is intended to be placed up against the bracket 11 and secured thereto to clamp the rim 13 on the tire carrier 10 as Fig. 2 shows.

Usually a long bolt is provided extending outside the tire carrier from edge to edge, but in this case I do not need that as I provide a bolt 14 simply passing through the bracket 11 and headed over on one end so that it cannot be removed and cannot be turned. This bolt passes freely through a perforation 15 in the clamp 12 and projects out from it a slight distance.

Surrounding the bolt 14 when in position is a lock casing 20 formed of a casting or forging and containing a pin tumbler lock of any usual kind. Instead of the cylinder of this lock having a locking member thereon, it is provided with a nut 21 which is connected with the cylinder 22 of the lock by a pin 23 or in any other desired way so that this nut turns with the key 23. There are no parts of this lock that reciprocate. The key when inserted is capable of turning the nut 21 directly and there is nothing to prevent the nut being turned separately except the pin tumblers of the lock. There is no external means and no sliding bolt of any kind for controlling the motion of this nut. The nut, as will be understood, readily screws on the bolt 14 and the lock is brought up in to position by turning the key around enough times to bring it up into contact with the clamp against the surface of which it fits.

The clamp, it will be observed, has side flanges as usual. I prefer to use an ordinary type of clamp. The casing 20 of the nut has two projections 24 and 25 that are shaped to fit in between the flanges of the clamp. These projections extend down substantially to the flat surface of the channel in the clamp and this construction prevents the turning of the lock casing after it is applied and, in fact, prevents its turning even while in the process of being applied. However, for the sake of safety and also for insuring that the clamp itself will not turn on the bracket 11, I provide the lock with a stud 26 which extends through a perforation 27 in the clamp and a perforation 28 in the bracket and prevents all these parts from turning.

The operation is very simple. The clamp being held in position by the stationary bolt 14, the lock is brought up to a point in which the end of the nut held thereby will engage the bolt and then the key is turned around and around to thread the nut up on the bolt as far as it will go. The stud 26 is guided into the two holes 27 and 28 and when the nut has reached its limiting position the key is turned back until it can be withdrawn and thereafter it is impossible to get at the nut in any way except by means of the key. It is fully protected by the shape of the hollow casing of the lock and the way in which it is secured on the clamp. In this way a good deal of complication is avoided, all the reciprocating parts of the usual locks being eliminated. The fastening of the nut to the cylinder plug direct and the tightening of the nut by the turning of the key is largely responsible for the simplicity of this device. When the key is removed the nut is located so that it cannot be turned in either direction and yet it is covered all around and cannot be tampered with from the outside.

I do away entirely with the locking of the nut so that it cannot be turned. This, however, is no disadvantage because the nut is housed within the casing and there is no way to get at it to turn it but it very greatly simplifies the mechanism, as will appear.

In the form shown in Figs. 6, 7, 8 and 9, some modifications are made. In this case the casing and the lock itself are not changed and I am not giving them different reference numbers, but on the end of the plug 22 I have provided an oscillating locking bolt 30. This is of cylindrical shape with a cylindrical opening 31 therein covered at the two sides by side flanges 32. These side flanges are parallel with each other as shown and project over the cylindrical passage 31 so as to receive the head 33 of the nut 34. This head is of a general circular shape slabbed off to form two flat sides 35. This leaves two projecting ends 36 with concentric outer surfaces having a diameter equal to the diameter of the recess 31. The distance between the sides 35 is the same as the distance between the ends of the flanges 32 with clearance. Therefore this nut 34 which goes on the bolt 14 can be received in this recess 31 and then when the key is turned relative to the nut, it will be locked by the flanges 32. This is a very practical form of this invention as the nut can be tightened separately on the tire carrier and it can be made as tight as is desired. The tightening does not have to be done with a key but can be done with a wrench having any desired amount of strength. After this the lock is put on. In this case also, however, the nut is entirely covered and concealed by the casing. The nut is not locked against turning by the lock itself. It is the lock itself that engages and holds the nut against removal of the lock casing or cover. The object is not to lock the nut but to prevent the removal of the cover or lock casing.

Although I have illustrated and described only two forms of the invention, I am aware of the fact that modifications can be made therein, by any person skilled in the art without departing from the scope of the invention as expressed in the claims. Therefore I do not wish to be limited to all the details of construction herein shown and described but what I do claim is:—

1. In a tire locking device, the combination with a clamp for securing a rim in position and a bolt extending through the clamp, of a nut for the bolt and a lock casing entirely concealing the nut and provided with locking devices therein for preventing the removal of the casing from the nut in an axial direction, and a pin on the clamp extending therefrom parallel with the bolt for preventing the removal of the casing in a lateral direction.

2. In a tire lock, the combination with a rim clamp and a bolt supported from the tire carrier, of a nut for the bolt for holding the rim, a pin tumbler cylinder and plug, and means on said plug for holding said nut to prevent the removal of the lock from the nut, said nut being rotatable with the plug.

3. In a device of the character described, the combination with a tire carrier and a clamp for clamping the rim of a tire thereon, of a bolt secured to the tire carrier and extending through the clamp and having a nut for securing the clamp to the carrier, a pin tumbler lock having a casing arranged to fit against the clamp all around and having a recesss therein for receiving said nut, the plug of said pin tumbler lock having means for engaging and turning the nut to prevent the disengagement of the lock casing from the nut and clamp.

4. In a spare tire lock, the combination with a lock casing having a pin tumbler cylinder and plug therein and provided with a configuration for conforming with the shape of the spare tire clamp and having a stud for engaging said clamp to prevent turning of the lock casing, said plug having a nut fixed thereon and rotatable therewith for securing the lock to a bolt on the tire carrier.

In testimony whereof I have hereunto affixed my signature.

MORRIS FALK.